May 27, 1969
E. C. KRAUS
3,446,636
METHOD FOR HEAT-STERILIZING FOOD IN SEALED CONTAINERS
Filed April 20, 1966
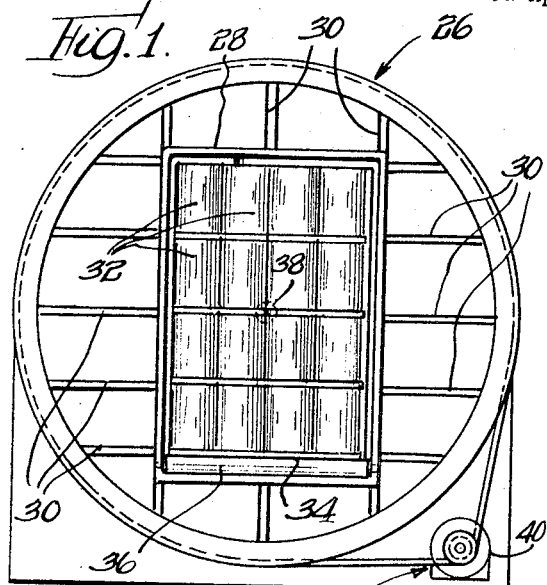
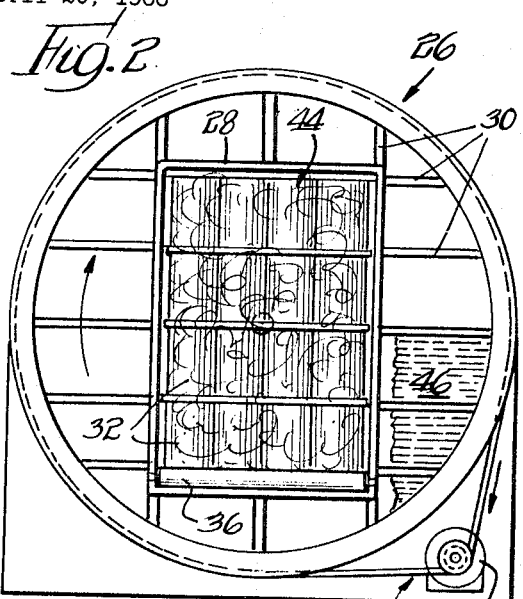
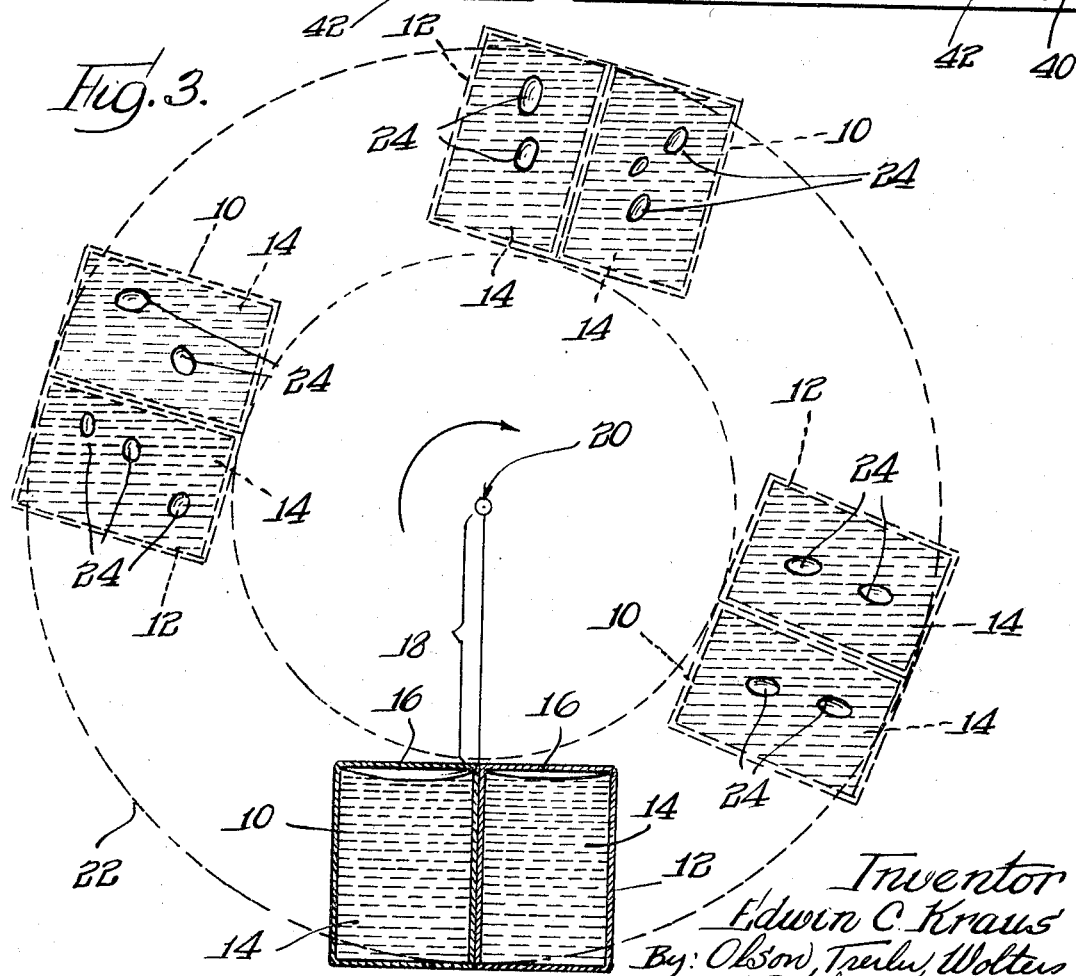
Inventor
Edwin C. Kraus
By: Olson, Trexler, Wolters
& Bushnell attys

United States Patent Office 3,446,636
Patented May 27, 1969

---

3,446,636
METHOD FOR HEAT STERILIZING FOOD IN SEALED CONTAINERS
Edwin C. Kraus, Ortonville, Minn., assignor to Big Stone Canning Company, Ortonville, Minn., a corporation of Delaware
Filed Apr. 20, 1966, Ser. No. 543,883
Int. Cl. A23l 3/02
U.S. Cl. 99—214                                    1 Claim

ABSTRACT OF THE DISCLOSURE

A method of heat-sterilizing sealed food containers in which a plurality of containers are oriented in rows and tiers of rows with a horizontal axis penetrating the approximate midpoint of the resultant mass, in which the containers are confined in the oriented position, and in which the mass of containers is rotated about the horizontal axis in order to agitate the contents.

---

This invention relates generally to the heat-sterilization of foods and especially to methods of agitating a sealed container of food while the same is being heat-sterilized.

The most common commercial procedure for heat-sterilizing canned foods involves placing baskets of filled but unsterilized cans in a stationary retort which is then closed, injected with steam and held for a specified time at a specified temperature. After the cook or sterilization has been accomplished, the retort is filled with cooling water; and subsequently the cans are removed. Thereafter, the process is repeated. In the described procedure, there is a substantial tendency to scorch viscous products which heat and cool largely by conduction, rather than by a combination of convection and conduction. This tendency is heightened in larger sized cans and is especially pronounced in No. 10 cans of creamed-style corn. The large cans of the latter product are so prone to the development of discoloration due to the carmelization of sugars that there is practically no demand for them by the restaurant and institutional trade ordinarily ordering that size container.

Efforts have been made to improve heat transfer in the sterilization procedure; and among these is a scheme whereby individual cans are rolled slowly in a spiral path through a retort. According to this procedure, the headspace bubble tends to stay in the "up" position and agitation of the can content is not vigorous enough to prevent localized overheating. In another scheme to improve heat transfer, the cans are fixed in position, longitudinal axis disposed horizontally, around the periphery of a drum which is rotated inside a retort. While acceptable results have been obtained from the latter procedure, it is decidedly uneconomical of both retort space and the attendant manpower. In addition, agitation of the container contents is somewhat frustrated by the tendency of the headspace bubble to roll about the cylindrical sidewall of the can body as the drum rotates.

A general object of the present invention is therefore to provide a method of heat-sterilizing which overcomes the foregoing shortcomings of the prior art and which is both efficient in its utilization of retort space and highly effective in achieving agitation of the container contents.

Another general object of the present invention is to provide a new and improved method of heat-sterilizing a flowable food sealed in a container having a gaseous headspace.

Still another object of the invention is to provide a method of heat-sterilization which assures uniform and rapid heating and cooling.

A further object of the invention is to provide a heat-sterilizing method which prevents localized overheating and the resultant discoloration that is normally incident to an extended cooking procedure.

A yet further object of the invention is to provide a method of heat-sterilization which permits the use of comparatively high temperatures.

These and other objects and features of the invention will become more apparent from a consideration of the following descriptions.

In the drawing:
FIG. 1 is an end view looking into the open door of a horizontal retort arranged to practice the present invention;
FIG. 2 is a view similar to the showing of FIG. 1 but illustrating the retort filled with steam and being rotated to agitate the filled cans charged into the retort; and
FIG. 3 is a schematic view showing a typical motion of the filled cans, the cans being shown in section to illustrate the agitation achieved by the headspace bubble.

In compliance with the process features of the present invention, a container filled with a flowable food and having a gaseous headspace is rotated or tipped end-over-end at a predetermined speed so as to agitate the contents using the headspace gas bubble as a mixing element. The can may be tipped about a horizontal axis that intersects the body of the can or about a horizontal axis spaced a predetermined distance from the can.

Considering FIG. 3 for the moment, a pair of metal cans 10 and 12 are shown disposed in upright position at the bottom of the figure. The cans 10 and 12 have previously been filled with a flowable food 14, such as for example creamed-style corn; and in compliance with conventional practice, a gaseous headspace 16 forms a bubble at the top of each can. The cans 10 and 12 are spaced a predetermined distance 18 from a horizontal axis 20; and in order that the headspace bubble 16 may act as a mixing element in agitating the contents of the cans 10 and 12, the containers are rotated through a vertical circle and at a speed less than the speed at which centrifugal force permanently locates the bubbles 16 at the periphery 22 of the circle of rotation. While the headspace bubble 16 sometimes remains intact as the cans are rotated, it frequently breaks into bubble fragments 24 as is suggested in the nonupright positions of the cans 10 and 12.

Although the cans 10 and 12 have been suggested as being made of metal and as being filled with creamed-style corn, it is to be understood that other types of containers may be used and the containers may be filled with any other flowable food product which is desired to be heated in a rapid and uniform manner. In addition, the viscosity of the product and the speed of rotation of the cans will be adjusted to optimize the agitation acheived by the movement of the headspace gas bubble.

The described agitation of the contents of the cans 10 and 12 is desirably achieved while the cans are disposed in a heat transfer medium at sterilizing temperatures whereby to produce the desired processing of the contents of the cans; and in compliance with an important feature of the present invention, a large number of cans are packed into a horizontal retort 26 as is shown in FIGS. 1 and 2. A rectangular cabinet 28 of perforated or open construction is positioned within the retort 26 by means of open bulkheads 30. Individual cans 32 are stacked in rows and tiers of rows in a crate 34 which is slidably disposed in the cabinet 28 on a roller conveyor 36 which forms the floor of the cabinet. The crates 34 are made to fit snugly in the cabinet 28 and to confine the cans 32 against movement within the cabinet. A horizontal axis 38 penetrates the approximate midpoint of the resultant mass of cans 32; and the retort 26 is mounted in trunnions, not shown, for rotation about the axis 38 whereby to rotate the cans 32, tipping them end-over-end so as to agitate the contents. A drive motor 40 is mounted to the support structure for the retort and rotates the retort about the axis 38 by means of a chain-and-sprocket arrangement 42. Other types of retort drives may be utilized.

With the cabinet 28 packed with a suitable number of the crates 34 containing cans 32, the door of the retort will be closed and a heat transfer medium such as steam will be introduced in order to sterilize and cook the product contained within the cans. This introduction of steam is suggested by the clouds of vapor 44. The retort and therefore the cans 32 are continuously rotated during the time that the heat transfer medium is present in the retort. Thus, the headspace gas bubble in each can may act constantly as a mixing element and agitate the contents to promote uniform and rapid heating thereof and to prevent localized overheating and resultant discoloration of the product, as for example might develop through the carmelization of sugars present in the product.

When the sterilization procedure is completed, the addition of steam to the interior of the retort is terminated and cooling water 46 introduced in continuation of the rotation. Cooling of the product within the cans 32 is likewise promoted when cooling water is present in the retort because of the agitation developed by the movement of the headspace gas bubble.

The agitation procedure of the present invention permits use of higher temperatures in the retort than are permitted by the prior art procedures and also achieves both a shorter heating and a shorter cooling period. The rapid and uniform heating and cooling which is achieved avoids discoloration of the products treated; and packing a substantial number of containers in the retort cooperates with the shorter cycle times in developing great efficiency in the use of the retort spacing. Moreover, handling the containers in crates permits use of factory lift trucks in filling and emptying the retort and is thus economical of labor.

While a particular embodiment of the invention has been disclosed, it should be understood, of course, that the invention is not limited thereto since many modifications may be made; and it is, therefore, contemplated to cover by the present application any such modifications as fall within the true spirit and scope of the appended claim.

The invention is claimed as follows:

1. A method of heat-sterilizing a flowable food sealed in thermally stable and conductive containers each having a gaseous headspace, which method comprises the steps of: orienting a plurality of containers in rows and tiers of rows with a horizontal axis of rotation penetrating the approximate midpoint of the resultant mass; confining said containers in the oriented position; enveloping said oriented containers in a heat transfer medium at sterilizing temperatures; and rotating the mass of containers about said horizontal axis at a predetermined speed so as to agitate the contents of each can using the individual gas headspace bubbles as mixing elements, whereby to promote the uniform and rapid heating of the contents of said containers.

References Cited

UNITED STATES PATENTS

| 2,517,542 | 8/1950 | Clifcorn et al. | 99—214 |
| 2,816,841 | 12/1957 | Kaap | 99—214 |

RAYMOND N. JONES, *Primary Examiner.*

S. B. DAVIS, *Assistant Examiner.*